A. v. F. Brown.
Conformator.
No. 11,302.  Patented July 11, 1854.
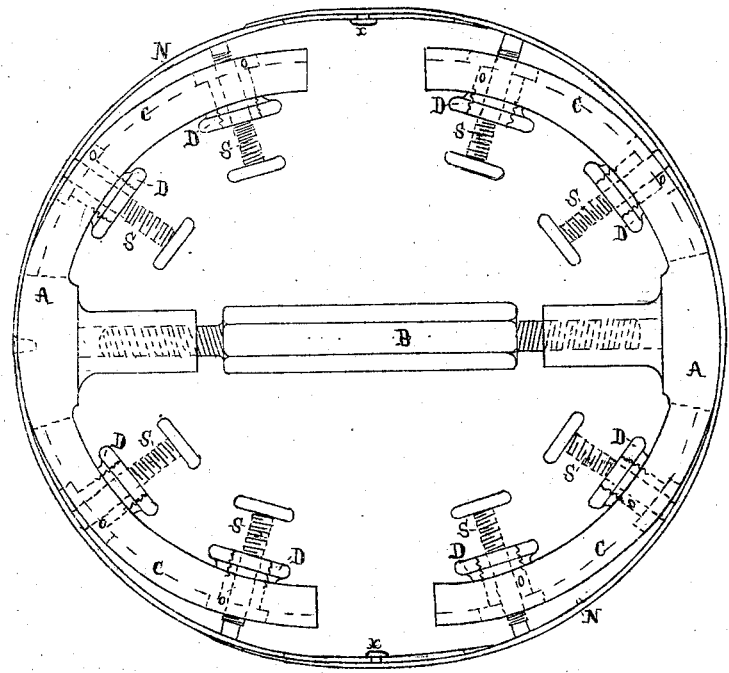

UNITED STATES PATENT OFFICE.

ADOLPH BROWN AND FELIX BROWN, OF NEW YORK, N. Y.

HAT-SHAPER.

Specification of Letters Patent No. 11,302, dated July 11, 1854.

*To all whom it may concern:*

Be it known that we, ADOLPH BROWN and FELIX BROWN, both of the city of New York, in the county and State of New York, have invented a new and Improved Hat-Shaping Machine; and we do hereby declare that the following is a full and exact description thereof, reference being had to the accompanying drawings and to the letters of reference marked thereon.

Our machine consists of two segments (A, A) connected through the coupling (B,) having on one side a right handed and on the other side a left handed screw, which fit in corresponding bosses fast on the segments, through which means, by turning the coupling B either to the right or left, said segments are capable to be brought nearer together or farther apart. Instead of making the screws in one piece with the coupling, the same may be made fast to the segments, and made to enter into the coupling. From each end of the segments, and running as far as practical toward the center, are parallel grooves (C) into which two or more pieces (O) are fitted, flush on the outside of the segments, and capable to be moved backward or forward, in said grooves (C), and held in any desired position by the nuts (D) on the inside of the segments. Through those pieces (O) setscrews (S) of the required length are screwed from the inside and made to bear against a flexible plate (N). This flexible plate N is put around the outside of the segments (A A) in two pieces, and overlap each other at the sides near (*x x*) where they are by means of sliding joints fastened together, so as to be capable to be extended or contracted as the case may require. Instead of making the grooves (C) in the ends of the segments and fitting therein the pieces (O) having the setscrews (S) passing through them, the ends of the segments may have as near as possible a great many setscrews screwed direct through them, whereby the required object may likewise very nearly be obtained.

The nature and purpose of our invention consists in the following: If a hat, already finished, is desired to be so made as to fit the head of any person exactly, then first heat the hat a little and put the machine in the same, bring any one or more of the pieces (O) with their setscrews opposite the point, or points, where the hat requires to be pressed out, and force by means of the setscrews (S) the flexible plate N so far out as will give the required shape, then iron on the outside with a warm iron and let the hat stand a few moments until cool, when the machine is taken out, and the hat will be formed to fit exactly.

We do not claim the segments or coupling, the same being now generally used but

What we claim as our invention, and desire to secure by Letters Patent, is—

The application of the movable pieces (O) with their setscrews (S) working in a groove made in the segments, or the equivalent thereof, and bearing against any desirable point of a flexible plate fitted around the outside, giving thereby the same any desirable shape as herein described.

ADOLPH BROWN.
      FELIX BROWN.

Witnesses:
 HENRY E. ROEDER,
 TOBIAS CONWAY ROWLEY.